(12) United States Patent
Park et al.

(10) Patent No.: US 10,071,611 B2
(45) Date of Patent: Sep. 11, 2018

(54) AIR CONDITIONER FOR VEHICLE

(71) Applicants: HYUNDAI MOTOR COMPANY, Seoul (KR); Kia Motors Corporation, Seoul (KR)

(72) Inventors: June Kyu Park, Hwaseong-si (KR); Yong Chul Kim, Hwaseong-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 407 days.

(21) Appl. No.: 14/622,727

(22) Filed: Feb. 13, 2015

(65) Prior Publication Data

US 2016/0137023 A1    May 19, 2016

(30) Foreign Application Priority Data

Nov. 17, 2014    (KR) .......................... 10-2014-0159919

(51) Int. Cl.
*B60H 1/00* (2006.01)
*B60H 1/22* (2006.01)
(Continued)

(52) U.S. Cl.
CPC ....... *B60H 1/00057* (2013.01); *B60H 1/0005* (2013.01); *B60H 1/00899* (2013.01);
(Continued)

(58) Field of Classification Search
CPC ........ B60H 1/00; B60H 1/00057; B60H 1/22; B60H 1/26; B60H 1/00899; B60H 1/0005;
(Continued)

(56) References Cited

U.S. PATENT DOCUMENTS

2006/0242984 A1    11/2006 Kang et al.
2011/0005255 A1*    1/2011 Tanihata ............ B60H 1/00785
62/238.7
(Continued)

FOREIGN PATENT DOCUMENTS

DE      4125768 A1 *    2/1993 ............... B60H 1/03
DE      10044433 A1    4/2002
(Continued)

OTHER PUBLICATIONS

DE 4125768 A1 machine translation.*
(Continued)

*Primary Examiner* — Len Tran
*Assistant Examiner* — Gordon Jones
(74) *Attorney, Agent, or Firm* — McDermott Will & Emery LLP (57) ABSTRACT

An air conditioner for a vehicle includes a heating line having a condenser at an inlet thereof and having an outlet communicating with an interior of the vehicle. A cooling line has an inlet communicating with the inlet of the heating line, an outlet communicating with the interior of the vehicle, and an evaporator connected to the condenser inside of the cooling line. One or more doors are provided to control a flow stream of each line and to control a temperature of air introduced into the interior of the vehicle.

18 Claims, 4 Drawing Sheets

(51) Int. Cl.
  *B60H 1/26* (2006.01)
  *B60H 1/32* (2006.01)
(52) U.S. Cl.
  CPC ............... *B60H 1/22* (2013.01); *B60H 1/26* (2013.01); *B60H 1/3227* (2013.01); *B60H 2001/00114* (2013.01); *B60H 2001/00142* (2013.01); *B60H 2001/00178* (2013.01)
(58) Field of Classification Search
  CPC ........ B60H 1/3227; B60H 2001/00114; B60H 2001/00142; B60H 2001/00178
  See application file for complete search history.

(56) References Cited

U.S. PATENT DOCUMENTS

| | | | | |
|---|---|---|---|---|
| 2013/0333406 A1* | 12/2013 | Takahashi | .......... | B60H 1/00921 62/238.7 |
| 2014/0075973 A1* | 3/2014 | Graaf | ................ | B60H 1/00328 62/115 |
| 2014/0075974 A1* | 3/2014 | Klein | ................... | B60H 1/3202 62/119 |
| 2014/0075975 A1* | 3/2014 | Graaf | ................ | B60H 1/00007 62/119 |
| 2016/0043669 A1* | 2/2016 | Fukuda | .................... | H02P 5/68 318/562 |

FOREIGN PATENT DOCUMENTS

| | | | | |
|---|---|---|---|---|
| EP | 2716478 A1 | 4/2014 | | |
| JP | 2004-299622 A | 10/2004 | | |
| JP | 2006-240575 A | 9/2006 | | |
| JP | 2013-199248 A | 10/2013 | | |
| JP | 2013-212829 A | 10/2013 | | |
| JP | 2015096420 A * | 5/2015 | ......... | B60H 1/00057 |
| KR | 10-2011-0090479 A | 8/2011 | | |
| KR | 10-2012-0021142 A | 3/2012 | | |
| KR | 10-2014-0086686 A | 7/2014 | | |
| WO | 2012/114767 A1 | 8/2012 | | |
| WO | 2013/105200 A1 | 7/2013 | | |
| WO | WO 2014076017 A1 * | 5/2014 | ......... | B60H 1/00064 |

OTHER PUBLICATIONS

JP 2015096420 A machine translation.*
Notice of Allowance issued in Korean Application No. 10-2014-0159919 dated Apr. 26, 2016.
Extended European Search Report issued in Application No. 15159176.5 dated Jul. 29, 2016.
Korean Office Action dated Sep. 16, 2015, issued in corresponding Korean Patent Application No. 10-2014-0159919.

* cited by examiner

AIR CONDITIONER FOR VEHICLE

CROSS-REFERENCE(S) TO RELATED APPLICATIONS

The present application claims benefit of priority to Korean Patent Application No. 10-2014-0159919, filed in the Korean Intellectual Property Office on Nov. 17, 2014, the entire contents of which is incorporated herein for all purposes by this reference.

TECHNICAL FIELD

The present disclosure relates to an air conditioner for a vehicle, and particularly, to an air conditioner for a vehicle for performing cooling and heating through a condenser and an evaporator.

BACKGROUND

An air conditioner for a vehicle includes a blower for absorbing air from an exterior and discharging the air to an interior of the vehicle. A heater and an evaporator are provided on a flow path of air flowing by the blower to cool or heat the air. Ducts are connected such that heated air or cooled air can be discharged to an upper side or a lower side of the interior of the vehicle.

However, such a conventional air conditioner requires a separate heating system in addition to a system for cooling, thus increasing cost for implementing respective systems and a great amount of energy for operating the respective systems, and deteriorating fuel efficiency of the vehicle.

The information disclosed in this Background section is only for enhancement of understanding of the general background of the invention and should not be taken as an acknowledgement or any form of suggestion that this information forms the prior art already known to a person skilled in the art.

SUMMARY

An aspect of the present disclosure is directed to an air conditioner for a vehicle which can heat and cool an interior of the vehicle with one system, without constructing plural systems for cooling and heating.

Other objects and advantages of the present disclosure can be understood by the following description, and become apparent with reference to the embodiments of the present inventive concept. Also, it is obvious to those skilled in the art to which the present disclosure pertains that the objects and advantages of the present disclosure can be realized by the means as claimed and combinations thereof.

In accordance with an embodiment of the present inventive concept, an air conditioner for a vehicle includes a heating line having a condenser at an inlet thereof, and an outlet communicating with an interior of the vehicle. A cooling line has an inlet communicating with the inlet of the heating line, an outlet communicating with the interior of the vehicle, and an evaporator connected to the condenser inside of the cooling line. One or more doors are open and closed to control a flow stream of each line and to control a temperature of air introduced into the interior of the vehicle.

The doors may comprise at least one door provided at each of the inlets and outlets of the heating line and cooling line.

The cooling line and the heating line may have through-holes to communicate with outside. The doors may open/close the through-holes so that flow paths of air flowing in the respective lines can be changed depending on the opening/closing of the through-holes.

The doors may include a first cooling door provided at an inlet of the cooling line and forming a flow path for outdoor air to be introduced into the cooling line when a through-hole is open. A second cooling door is provided at an outlet of the cooling line and forming a flow path for the air of the cooling line to be discharged to the outside when a through-hole is open.

The doors may include a heating door provided at an outlet of the heating line and forming a flow path for air of the heating line to be discharged to the outside when a through-hole is open.

The first cooling door may be open to an inside of each of the cooling line and heating line to control an amount of air introduced from the condenser to the cooling line or the heating line.

The second cooling door and the heating door may be open to the inside of the cooling line and heating line to block the cooling line or the heating line at opening.

The air conditioner may further include a circulation line communicating with the cooling line and the interior of the vehicle to recirculate indoor air of the vehicle to the cooling line. A third cooling door is open/closed to connect/disconnect the communication between the cooling line and the circulation line.

The air conditioner may open the first cooling door, close the second cooling door, and open the heating door for cooling the interior of the vehicle, so that cooled air passing through the evaporator can be introduced into the interior of the vehicle.

The air conditioner may close the heating door and open at least one of the first and second cooling doors for heating the interior of the vehicle so that air of the condenser can be introduced into the interior of the vehicle.

The air conditioner may further include blowers blowing air toward the outlet of each line and provided between the first cooling door and the second cooling door and between the condenser and the heating door.

The air conditioner may further include a positive temperature coefficient (PTC) heater provided between the blower and the heating door.

According to the air conditioner for a vehicle having the aforementioned configuration, cooling and heating can be both implemented while utilizing the air conditioner without any change, so that cost can be reduced and fuel efficiency can be improved as compared with the conventional system in which cooling and heating systems are separately implemented.

In addition, since the configuration is simplified, complexity of control can be reduced and production is facilitated.

DETAILED DESCRIPTION

An air conditioner for a vehicle in accordance with exemplary embodiments of the present inventive concept will be described below in more detail with reference to the accompanying drawings. The present inventive concept may, however, be embodied in different forms and should not be construed as limited to the embodiments set forth herein. Rather, these embodiments are provided so that this disclosure will be thorough and complete, and will fully convey the scope of the present disclosure to those skilled in the art. Throughout the disclosure, like reference numerals refer to like parts throughout the various figures and embodiments of the present inventive concept.

Figure 1:
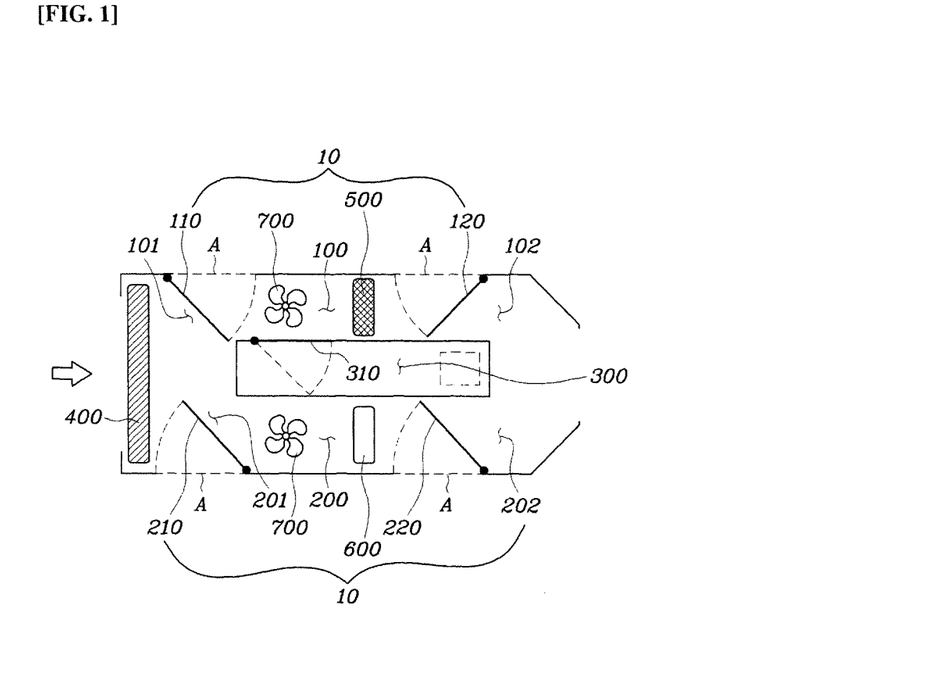
FIG. 1 is a view illustrating the configuration of an air conditioner for a vehicle in accordance with an embodiment of the present inventive concept.

FIG. 1 is a view illustrating the configuration of an air conditioner for a vehicle in accordance with an embodiment of the present inventive concept. The air conditioner includes a heating line 200 having a condenser 400 at an inlet 201 thereof, and having an outlet 202 communicating with an interior of the vehicle. A cooling line 100 includes an inlet 101 communicating with the inlet 201 of the heating line 200, an outlet 102 communicating with the interior of the vehicle, and an evaporator 500 connected to the condenser 400 inside of the cooling line 100. At least one door 10 controls a flow stream of each line and controls a temperature of air introduced into the interior of the vehicle.

The door 10 may be a flap and rotatable about one end portion. At least one flap may be provided at each of the inlets 101, 201 and outlets 102, 202. The cooling line 100 and heating line 200 have through-holes A to communicate with outside. The door 10 opens/closes the through-holes A, and the flow path of air flowing in the respective lines 100 and 200 can be changed according to the opening/closing of the through-holes A.

The condenser 400 and the evaporator 500 are provided in one cooling system, in which the condenser 400 receives refrigerant compressed from a compressor (not shown) and radiates heat of the refrigerant. The refrigerant condensed by the condenser 400 passes through an expansion valve (not shown) and absorbs the heat in the evaporator 500, thereby cooling the air passing through the evaporator 500. Then, the air which has passed through the evaporator 500 is reintroduced into the compressor.

According to the embodiment of the present inventive concept, when heating the inside of the vehicle, the condenser 400 is used as a heat-generating element, through which the air is introduced into the heating line 200, and thus the heat radiated from the condenser 400 can be used as a heating source. Therefore, for both cooling and heating, the condenser 400 heats the air while the evaporator 500 cools the air, so that heating as well as cooling can be achieved by using one cooling system.

Since heating of the inside of the vehicle is performed using the heat discarded from the vehicle cooling system, a separate system for heating is not necessary, thus, reducing cost and weight and simplifying the system and manufacturing processes.

The inlet 101 and outlet 102 of the cooling line 100 may be connected to the inlet 201 and outlet 202 of the heating line 200, respectively, to form a common input and a common output. The through-holes A may be formed on wall portions of the respective lines 100 and 200 so as to communicate with the outside. The inlet 101, 102 and the outlet 102, 202 may be independently formed according to each line 100 and 200, or may be formed to partially communicate with each other as described above. In addition, the through-holes A may be suitable with positions and the number of doors 10.

The door 10 may include a first cooling door 110 provided at the inlet 101 of the cooling line 100 and forming a flow path for outdoor air to be introduced into the cooling line 100 on opening of a through-hole A. A second cooling door 120 is provided at the outlet 102 of the cooling line 100 and forming a flow path for the air of the cooling line 100 to be discharged to the outside on opening of a through-hole A.

In addition, the door 10 may additionally include a heating door 220 provided at the outlet 202 of the heating line 200 and forming a flow path for the air of the heating line 200 to be discharged to the outside on opening of a through-hole A. An auxiliary heating door 210 is provided at the inlet 201 of the heating line 200 and forming a flow path for a part of the air, which is discharged from the condenser 400, to be discharged to the outside.

According to another embodiment of the present inventive concept, the first cooling door 110 may open to the inside of the cooling line 100 and have one end rotatably coupled to the inlet part 101 of the cooling line 100 on a circumferential portion of the through-hole A. Another end of the first cooling door 110 may face the outlet 102 of the cooling line 100, thus blocking the air or controlling the amount of air introduced from the condenser 400 to the cooling line 100 by closing or partially opening the cooling line 100 on opening of the first cooling door 110.

In addition, the second cooling door 120 and the heating door 220 may open to the insides of the cooling line 100 and the heating line 200, respectively, on opening and have each end thereof rotatably coupled to the outlets 102, 202 of the lines 100, 200 on circumferential portions of the through-holes A, respectively. Other ends of the second cooling door 120 and the heating door 220 may face the inlets 101, 201 of the lines 100 and 200, respectively, thus discharging air flowing in each line 100 or 200 to the outside by closing the cooling line 100 or the heating line 200 on opening thereof or introducing the air into the interior of the vehicle by partially opening the second cooling door 120 or the heating door 220. In addition, the auxiliary heating door 210 may have a different installation position from the heating door 220 but have a configuration similar to that of the heating door 220, so as to discharge only a part of air discharged from the condenser 400 to the outside.

Although according to the embodiment of the present inventive concept, the air conditioner for a vehicle described above includes the inlets 101, 201 and the outlets 102, 202 of the lines 100 and 200 provided with one door 10, positions and the number of doors 10 to be mounted may be variously set according to the intention of a designer. In addition, each door 10 may have a motor or a driving device capable of rotating the door 10 so that a degree of opening of the door 10 can be controlled according to an external signal. The through-holes A are formed in all positions where the doors 10 are mounted.

According to the degree of opening of each door 10, air flowing in each line 100 and 200 can be discharged to the outside, the amount of air introduced into the interior of the vehicle can be determined.

Further, the first cooling door 110 may be disposed between the condenser 400 and the evaporator 500, and the evaporator 500 may be disposed between the first cooling door 110 and the second cooling door 120.

In addition, a positive temperature coefficient (PTC) heater 600 may be provided between the auxiliary heating door 210 and the heating door 220, and the auxiliary heating door 210 may be provided between the condenser 400 and the PTC heater 600. When the PTC heater 600 is included, it is possible to provide an additional heat source when the condenser 400 cannot provide enough heat.

In addition, blowers 700 for flowing air to the outlets 102, 202 of the lines 100, 200 may be provided between the first cooling door 110 and the second cooling door 120 and between the auxiliary heating door 210 and the heating door 220, or provided between the first cooling door 110 and the evaporator 500 and between the auxiliary heating door 210 and the FTC heater 600. Since the blowers 700 are provided in the respective lines 100 and 200 the amount of air flow can be controlled according to the respective lines 100 and 200. In addition, since the blowers 700 are disposed at rear sides of the evaporator 500 and the PTC heater 600, respectively, the blowers 700 are not directly exposed to cooled or heated air, so that life span of the blowers 700 can be extended.

Each disposition may be variously set, and that a position and the number of blowers 700 may also be variously provided.

The air conditioner in accordance with the present disclosure may further include circulation line 300 communicating with the cooling line 100 and the interior of the vehicle and recirculating the air inside of the vehicle to the cooling line 100. A third cooling door 310 may connect/disconnect the communication between the cooling line 100 and the circulation line 300. The third cooling door 310 may be opened/closed, at a boundary position at which the cooling line 100 and the circulation line 300 communicate with each other.

The circulation line 300 may be provided between the cooling line 100 and the heating line 200 so as to distinguish the cooling line 100 and the heating line 200 from each other. However, such a configuration is not essential, and the circulation line 300 may be provided as a separate line.

Figure 2:
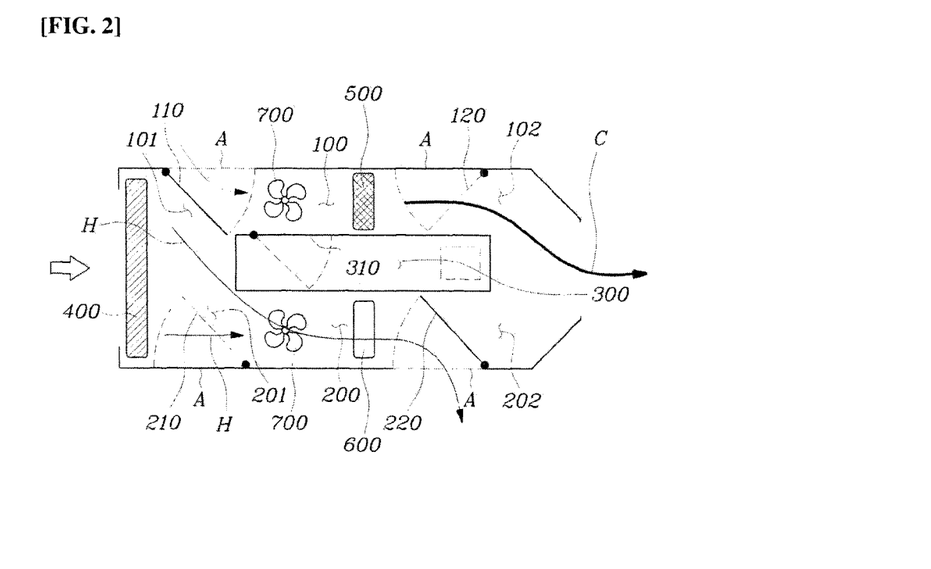
FIG. 2 is a view illustrating air flow for cooling of an air conditioner for a vehicle in accordance with an embodiment of the present inventive concept.

Hereinafter, a procedure for controlling air flow according to temperature will be described with reference to the aforementioned configuration and FIGS. 2 to 7. First, FIG. 2 is a view illustrating air flow for cooling of an air conditioner for a vehicle in accordance with an embodiment of the present inventive concept. The first cooling door 110 is open to block heated air H, which is discharged from the condenser 400, from being introduced into the cooling line 100. The second cooling door 120 is closed to introduce cooled air C, which passes through the evaporator 500, into the interior of the vehicle via the outlet part 102 of the cooling line 100. In this case, the heating door 220 may be open to discharge the heated air H to the outside, so that the heated air H can be prevented from being introduced into the interior of the vehicle.

Figure 3:
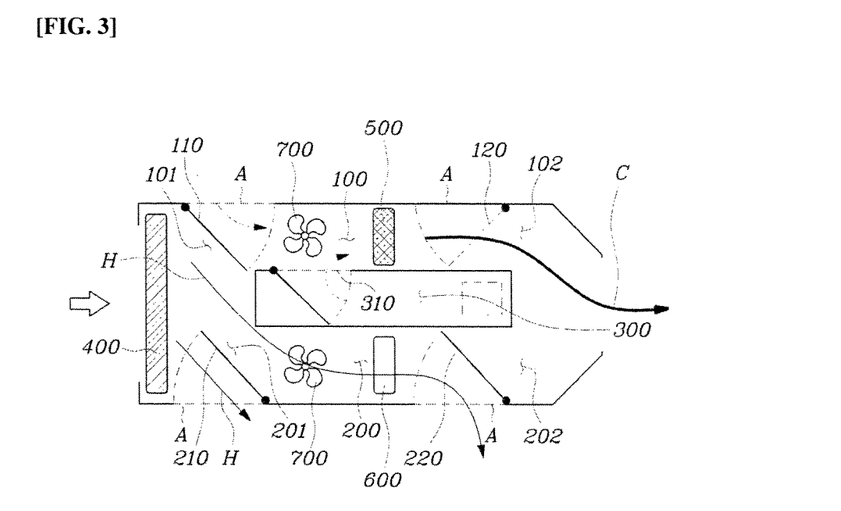
FIG. 3 is a view illustrating air flow for cooling in an indoor air recirculation mode.

In addition, FIG. 3 is a view illustrating air flow for cooling in an indoor air recirculation mode. In order to increase efficiency of cooling and to optimize cooling performance, the air conditioner recirculates a part of cooled air C in the inside of the vehicle. In this case, each door may be open and closed in a manner similar to that in the aforementioned air flow for cooling. Additionally, the third cooling door 310 may be open to enable the cooling line 100 and the circulation line 300 to communicate with each other so that a part of cooled indoor air can be introduced into the cooling line 100 through the circulation line 300. Therefore, the third cooling door 310 may be disposed between the first cooling door 110 and the second cooling door 120 to introduce air to the inside of the cooling line 100. In addition, in order to smoothly discharge the heated air H discharged from the condenser 400, the auxiliary heating door 210 may be open as the heating line 200 is open.

Figure 4:
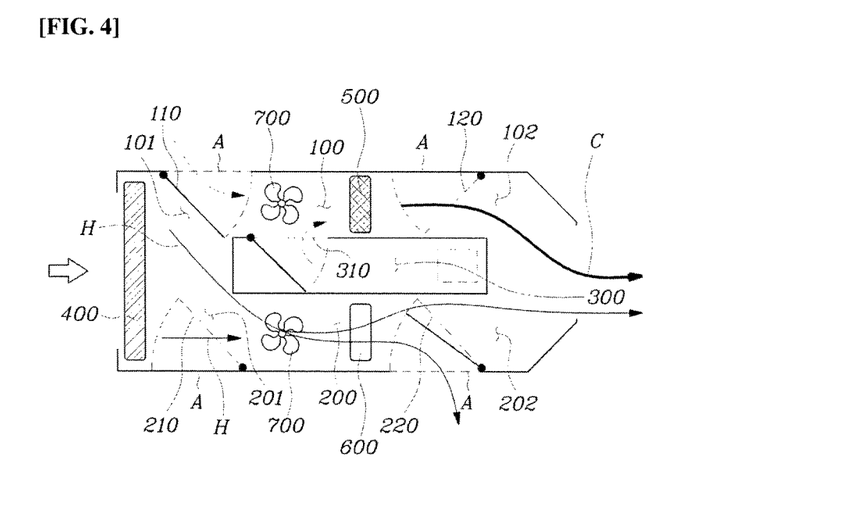
FIG. 4 is a view illustrating air flow when temperature is controlled during cooling.

An appropriate temperature control may be performed even during cooling. FIG. 4 is a view illustrating air flow when temperature is controlled during cooling. Each door 10 may be open in a manner similar to that described above, except that the heating door 220 does not completely close the heating line 200 but is in a partially open state, so that a part of the air discharged from the condenser 400 can be mixed with cooled air C, which is discharged from the cooling line 100, through the outlet part 202 of the heating line 200, and then can be introduced into the inside of the vehicle.

Degrees of opening of all the doors 10 as well as the heating door 220 can be variously set for temperature control, which can be implemented through various embodiments according an intension of a designer.

Figure 5:
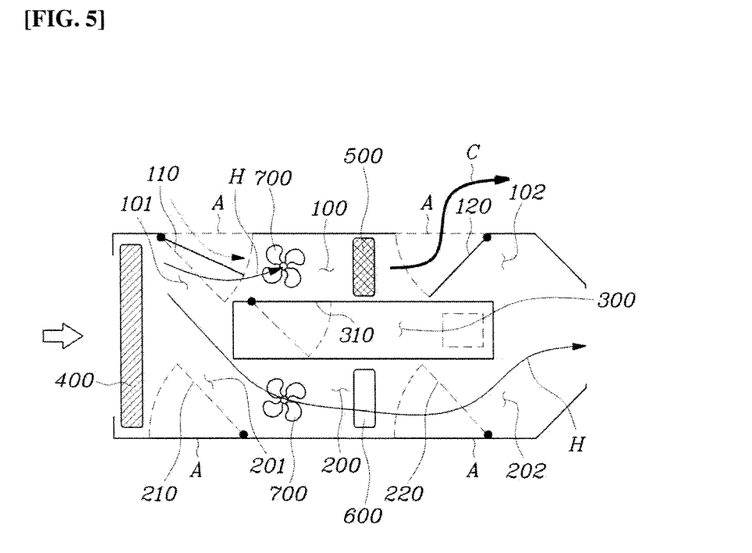
FIG. 5 is a view illustrating air flow for heating of an air conditioner for a vehicle in accordance with an embodiment of the present inventive concept.

FIG. 5 is a view illustrating air flow for heating of an air conditioner for a vehicle in accordance with an embodiment of the present inventive concept. When heating the inside of the vehicle, the auxiliary heating door 210 and the heating door 220 may be closed so that the heated air H from the condenser 400 can be introduced to the inside of the vehicle, and the first cooling door 110 and/or the second cooling door 120 may be open so that the cooled air C discharged from the evaporator 500 can be discharged to outside.

When vehicle heating is carried out, the outside temperature is in a relative low state. Even in such a state, the evaporator 500 continuously performs a cooling operation, thus may damage the evaporator 500 situation. Therefore, when vehicle heating is carried out, the first cooling door 110 is controlled not to completely close the cooling line 100 so that a part of the heated air H of the condenser 400 can be introduced into the cooling line 100, thereby preventing the evaporator 500 from being excessively cooled.

Figure 6:
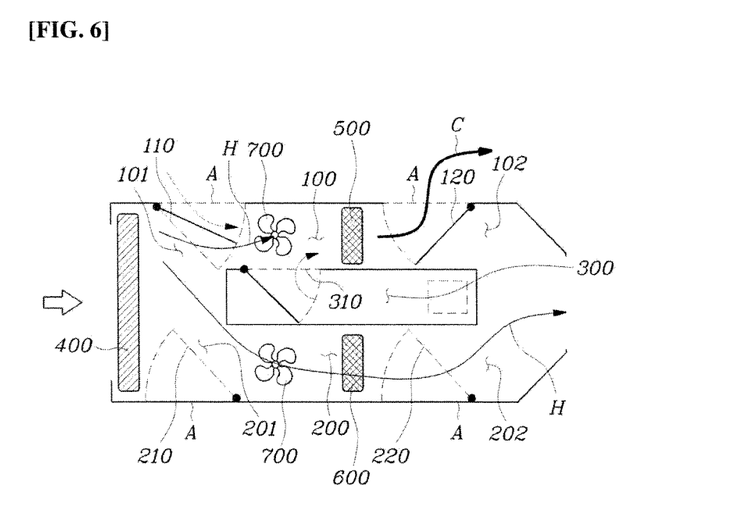
FIG. 6 is a view illustrating air flow for heating in an extremely low temperature state.
Figure 7:
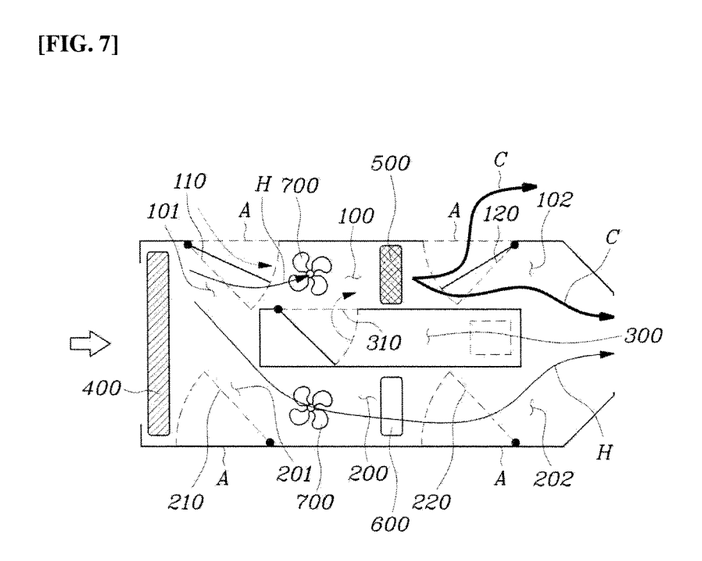
FIG. 7 is a view illustrating air flow when temperature is controlled during heating.

Particularly, when the outside temperature is in an extremely low temperature state, for example, minus twenty degrees or lower, just partially opening the cooling line 100 which has been closed may not be sufficient. Therefore, in this case, as shown in FIG. 6, the third cooling door 310 may be open to additionally introduce air of the inside of the vehicle to the evaporator 500, so that the evaporator 500 can be prevented from being excessively cooled.

The degree of opening of the first cooling door 110 with respect to the cooling line 100 can increase in accordance with environments. However, in this case, the amount of heated air H introduced into the heating line 200 decreases. Therefore, the degree of opening of each door 10 may be appropriately adjusted through tests according to outside temperatures and various circumstances.

In addition, when the outside temperature is in the extremely low temperature state, it is possible to ensure an additional heat source by operating the PTC heater 600. The temperature for the operation of the PTC heater may be variously set according to an intension of a designer.

Even when heating the inside of the vehicle is carried out, an appropriate temperature control may be required according to circumstances. In this case, as shown in the air flow view of FIG. 7, the second cooling door 120 is controlled to open a part of the cooling line 100 so that a part of the air discharged from the evaporator 500 is not discarded to the outside but rather is introduced into the inside of the vehicle, together with the heated air H discharged from the heating line 200. For temperature control, not only the degree of opening of the second cooling door 120 but also the degrees of opening of the other doors 10 may be variously set through experimental tests.

According to the air conditioner for a vehicle having the aforementioned configuration, cooling and heating can be both implemented while utilizing an air conditioner of a vehicle without any change, so that cost can be reduced and fuel efficiency can be improved as compared with the case in which cooling and heating are implemented by separate systems.

In addition, since the configuration on the system is simplified, the complexity of control can be reduced, so that the production is facilitated.

While the present inventive concept has been described with respect to the specific embodiments, it will be apparent to those skilled in the art that various changes and modifications may be made without departing from the spirit and scope of the invention as defined in the following claims.

What is claimed is:

1. An air conditioner for a vehicle, comprising:
   a heating line having a condenser at an inlet thereof and an outlet communicating with an interior of the vehicle;
   a cooling line having an inlet communicating with the inlet of the heating line, an outlet communicating with the interior of the vehicle, and an evaporator connected to the condenser inside of the cooling line for circulating a refrigerant;
   one or more doors opening and closing to control a flow stream of each line and to control a temperature of air introduced into the interior of the vehicle; and
   a circulation line communicating with the cooling line and the interior of the vehicle to recirculate the air in the interior of the vehicle to the cooling line,
   wherein the condenser is disposed at a position where the inlet of the heating line and the inlet of the cooling line are connected to each other,
   wherein the evaporator is disposed in the cooling line at a position of downstream from the condenser in a direction of air flow,
   wherein at least one of the one or more doors is disposed between the condenser and the evaporator in a flow path for outdoor air to be introduced into the cooling line,
   wherein an amount of heated air after passing through the condenser to pass through the evaporator is controlled depending on degrees of opening of the at least one of the one or more doors, and
   wherein the circulation line is disposed between the cooling line and the heating line so as to distinguish the cooling line and the heating line from each other.

2. The air conditioner of claim 1, wherein the one or more doors include at least one door at each of the inlets and outlets of the heating line and cooling line.

3. The air conditioner of claim 1, wherein the cooling line and the heating line have through-holes to communicate with outside, and the one or more doors open/close the through-holes, such that flow paths of the air flowing in the respective lines are changed according to the opening/closing of the through-holes.

4. The air conditioner of claim 3, wherein the one or more doors comprise:
   a first cooling door provided at the inlet of the cooling line and forming a flow path for outdoor air to be introduced into the cooling line in response to the first cooling door is open; and
   a second cooling door provided at the outlet of the cooling line and forming a flow path for the air of the cooling line to be discharged to the outside in response to the second cooling door is open.

5. The air conditioner of claim 4, wherein the one or more doors further comprise a heating door provided at the outlet of the heating line and forming a flow path for the air of the heating line to be discharged to the outside in response to a third through-hole is open.

6. The air conditioner of claim 4, wherein the first cooling door is open to inside of each of the cooling line and heating line at opening to control an amount of air introduced from the condenser to the cooling line or the heating line.

7. The air conditioner of claim 4, wherein the second cooling door and the heating door are open to insides of the cooling line and heating line, respectively, to block the cooling line or the heating line at opening.

8. The air conditioner of claim 4, further comprising:
   a third cooling door disposed at the circulation line for connecting/disconnecting the communication between the cooling line and the circulation line.

9. The air conditioner of claim 5, wherein the air conditioner opens the first cooling door, closes the second cooling door, and opens the heating door for cooling the interior of the vehicle such that cooled air passing through the evaporator is introduced into the inside of the vehicle.

10. The air conditioner of claim 5, wherein the air conditioner closes the heating door and opens at least one of the first and second cooling doors for heating the interior of the vehicle such that the air of the condenser is introduced into the interior of the vehicle.

11. The air conditioner of claim 5, further comprising:
    blowers blowing air toward the outlet of each line are provided between the first cooling door and the second cooling door, and between the condenser and the heating door.

12. The air conditioner of claim 11, further comprising:
    a positive temperature coefficient (PTC) heater provided between the blower and the heating door.

13. The air conditioner of claim 5, further comprising:
    an auxiliary heating door provided at the inlet of the heating line and forming a flow path for a part of the air of the condenser to be discharged to the outside.

14. The air conditioner of claim 13, further comprising:
    a positive temperature coefficient (PTC) heater provided between the auxiliary heating door and the heating door,
    wherein the auxiliary heating door is provided between the condenser and the PTC heater.

15. The air conditioner of claim 14, further comprising:
    blowers that disposed between the auxiliary heating door and the heating door and blow air toward the outlet of each line.

16. The air conditioner of claim 14, further comprising:
    blowers that disposed between the first cooling door and the evaporator and between the auxiliary heating door and the PTC heater, and blow air toward the outlet of each line.

17. The air conditioner of claim 13, wherein the air conditioner closes the heating door and the auxiliary heating door for heating the interior of the vehicle so that the air of the condenser is introduced to the interior of the vehicle.

18. The air conditioner of claim 12, wherein the blowers are disposed at rear sides of the evaporator and the PTC heater, respectively.

\* \* \* \* \*